United States Patent Office 2,806,691
Patented Sept. 17, 1957

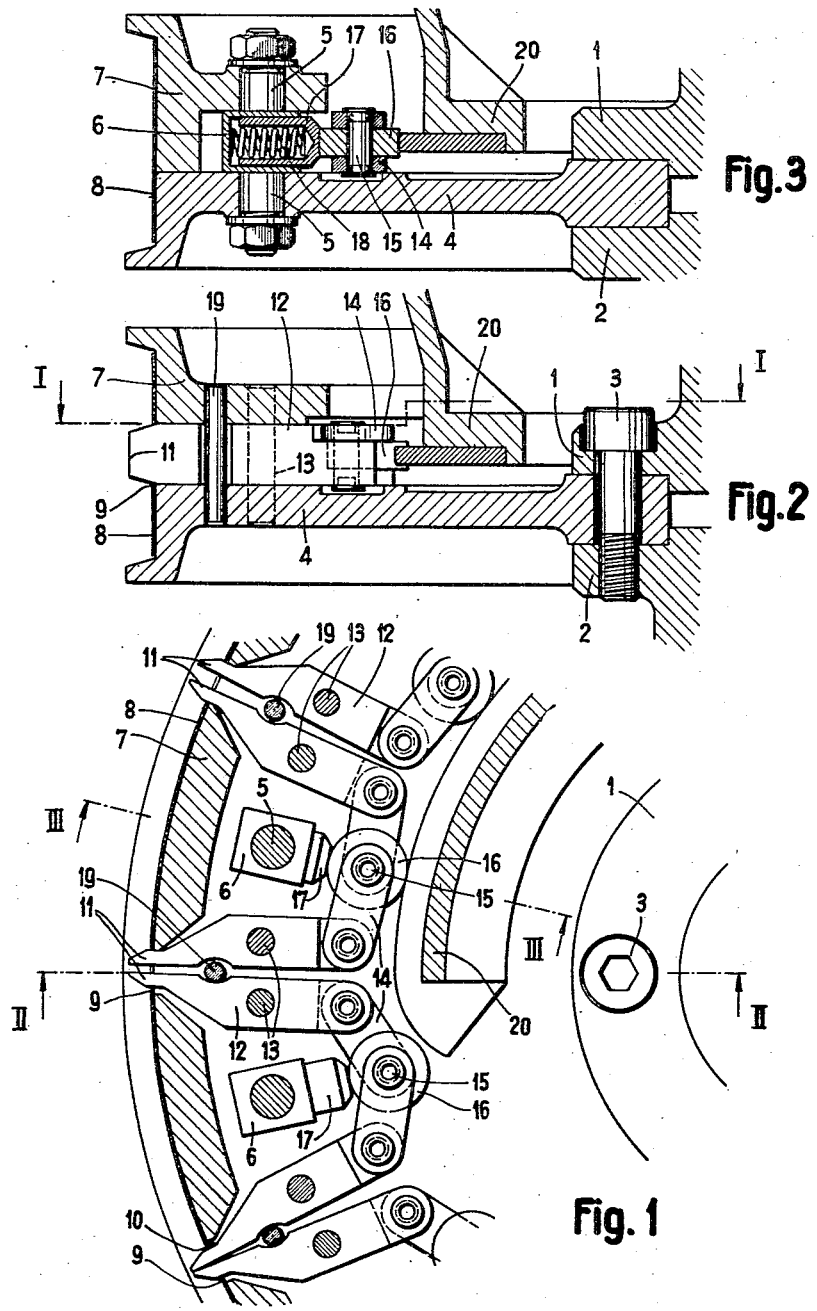

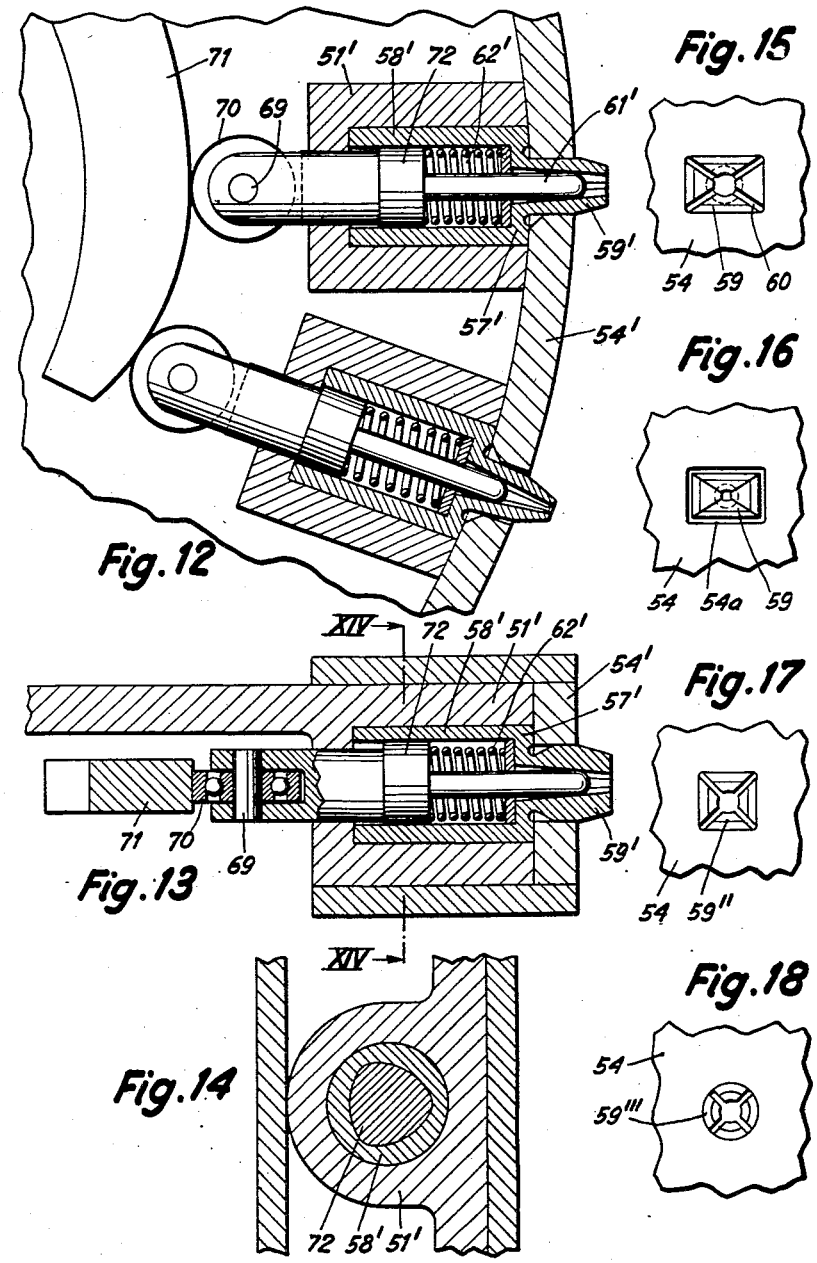

2,806,691

TAPE CONVEYOR

Erich Kälin, Netstal, Switzerland, assignor to Stoffel & Co., Saint Gallen, Switzerland Application June 13, 1955, Serial No. 515,150

Claims priority, application Switzerland December 4, 1954

12 Claims. (Cl. 271—2.3)

The present invention relates to a tape conveyor comprising a perforated tape and a toothed element for driving the same.

In conveyors of this type known so far, the teeth are rigidly secured to the driving element, and it cannot be avoided that when the tape is running on and off the driving element, which latter for example may be a cylinder, at least one edge of the holes contacts the respective flank of the teeth, which always gives origin to a certain amount of friction. The latter is particularly detrimental in that it causes wear and a breaking away of the edges of the holes.

The main object of the present invention is to render the engagement of the teeth with the holes or the disengagement thereof from the holes frictionless. This is attained by making the teeth of the driving element spreadable in the direction of movement, whereby each tooth by means of a mechanism is, at the most, held so long in the spreaded condition and thereby in contact with the wall of the hole for the purpose of effecting a positive driving engagement between driving element and tape, as the tape is snugly superposed on that section of the driving element which is adjacent of the tooth under consideration.

Such a conveyor means is suited, for example, for film printing machines of the kind, known per se, in which the web to be printed repeatingly is glued on to an endless follower blanket. The latter then is identical with the perforated tape of the present invention.

Practice has shown that it is of advantage in certain cases to be able to maintain the lateral position of the perforated tape with highest accuracy, and that often also those hole-edges which are situated laterally of the teeth, are subjected to wear.

This is taken into account, in one form of the invention, by making the teeth spreadable also in a direction at right angles to the direction of movement, and employing the same mechanism for spreading each tooth in both directions.

Various forms of the invention are shown, by way of example, in the accompanying drawings, in which—

Figs. 1 to 3 partly illustrate a first embodiment, Fig. 1 being a section on the line I—I of Fig. 2, and Figs. 2 and 3 being a section on the line II and, respectively, III—III of Fig. 1;

Figs. 4 to 6 partly illustrate a second embodiment, Fig. 4 being a section similar to Fig. 1, and Figs. 5 and 6 being a section on the line V—V and, respectively, VI—VI of Fig. 4;

Figs. 7 to 9 partly illustrate a third embodiment, Fig. 7 showing a section on the line VII—VII of Fig. 8, and Figs. 8 and 9 showing a section on the line VIII—VIII and, respectively, IX—IX of Fig. 7;

Figs. 12 and 13 show similar sections through a fifth embodiment;

Fig. 14 shows a section on the line XIV—XIV of Fig. 13;

Fig. 15 depicts a single tooth in spreaded condition;

Fig. 16 shows the same tooth in contracted position; and

Figs. 17 and 18 show two modifications of the teeth in spread condition, as in Fig. 15.

Figure 6:
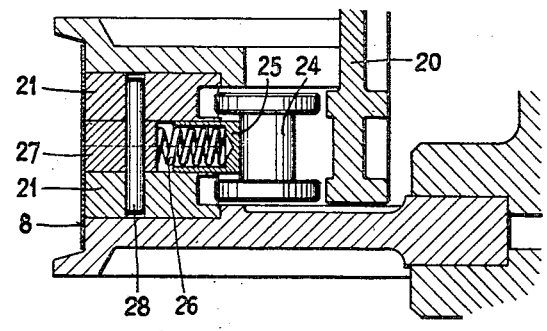

In Figs. 1 to 3, 1 and 2 designate hub portions of the driving element which, in a manner not shown, is secured to a drive shaft. Said element further comprises a disc-shaped body 4 located by means of screws 3 between the hub portions 1 and 2. To body 4 is secured, by means of bolts 5 of which the intermediate portion forms a spring box 6, a rim member 7. On to a certain portion of the cylindrical surface of the driving element is superposed a flexible tape 8 which is provided with uniformly spaced rectangular holes 9. To said spacing corresponds the spacing of recesses 10 in rim member 7.

Through each recess 10 project the beak-like ends 11 of two levers 12. Each of these two-arm levers is pivoted on a pin 13 of which the two ends are mounted in bores of the wheel body 4 and, respectively, of the wheel rim 7. The two opposite levers of two adjacent pairs of levers are connected, at their interior ends, through a strap 14 to the axle pin 15 of a follower 16, forming some sort of a toggle joint. A bushing 17 which is movable in box 6 radially of the wheel, constantly engages follower 16 under the action of a helical spring 18, whereby the appurtenant lever 12 (as shown on the left side of Fig. 1) are so rotated that their ends 11 move towards the center of recess 10 and there abut against a stop pin 19 which is anchored in the parts 4 and 7. The ends 11 form teeth which are spreadable in the direction of movement (peripheral direction). Such spreading apart takes place at each revolution at a time when the cam roller 16 pertaining to the tooth half-portions of two adjacent teeth, has run on to a stationary curved cam 20 and has been moved radially outwards against the action of spring 18. The tooth half-portions formed by the lever ends 11 then abut against the associated recesses 10.

The mechanism is so arranged—inter alia by appropriately dimensioning and arranging the cam track—that each tooth at the most only is maintained so long in spreaded condition and, thereby, in abutment against the wall of the appurtenant recess 10, for the purpose of effecting a positive driving connection between driving element and tape, as the tape is snugly superposed on that section of the driving element which is adjacent to the tooth under consideration.

The same consideration holds true for the two other embodiments which are presently to be described and which differ from the first only in a structural respect.

Figure 5:
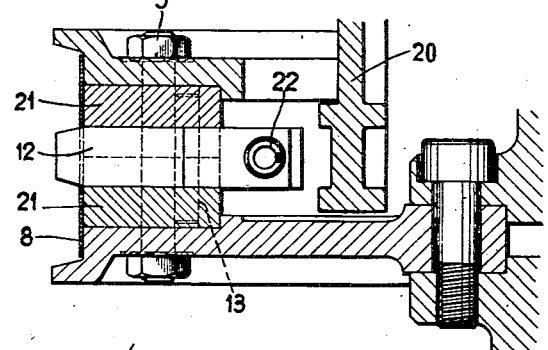
Figure 4:
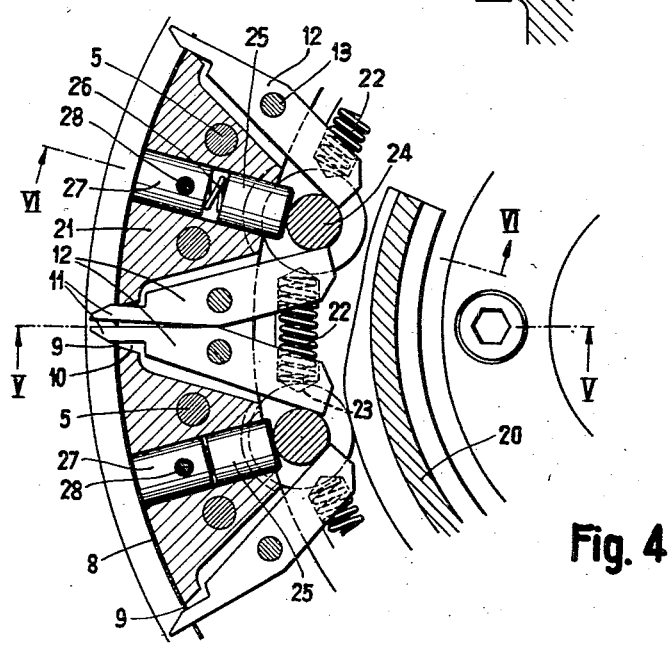

In the embodiment shown in Figs. 4 to 6, the recesses 10 are provided in two rings 21 which are located between the wheel parts 4, 7 inter-connected by the screws 5. In bores of the rings 21 are mounted the pins 13 which serve as prisoners and pivot pins of the levers 12. Between the inner ends of each pair of levers is inserted a helical spring 22 of which the ends are seated in blind holes 23 of said lever ends. The opposite levers of two lever pairs thereby are urged up against a stop pin 24 which in turn via a spring box 25 and a helical spring 26 which is stronger than spring 22, is supported on the pin 27. The latter is mounted in a bore of the ring pair 21, being traversed by a prisoner 28 of which the ends are fixedly engaged in the rings 21. The plate-shaped flanges 24a of stop pin 24 at each revolution run up on the stationary cam track 20, thus being moved radially outwards so that the respective springs 22 spread the inner ends of the two-arm levers 12. The beak-shaped lever ends 11 forming the tooth half-portions thus are spread on that portion of their circular track on which the cam track 20 is not effective or, respectively, absent, as shown in the right-hand side of Fig. 4.

Figure 9:
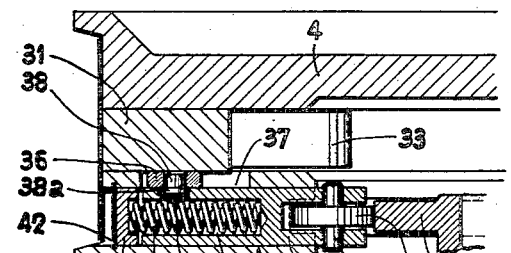
Figure 8:
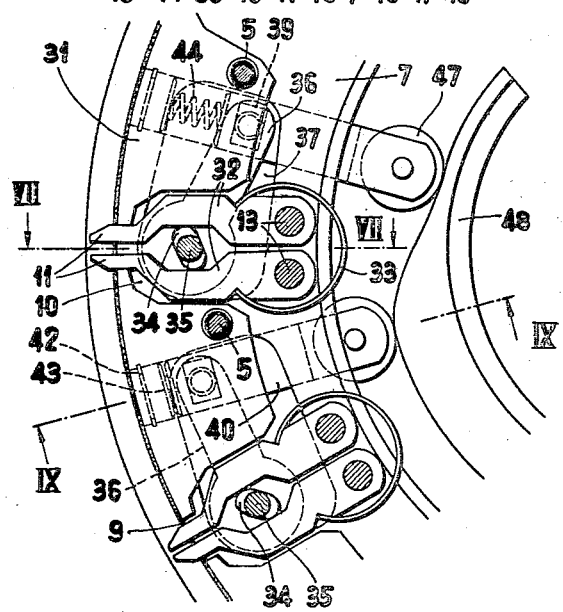
Figure 7:
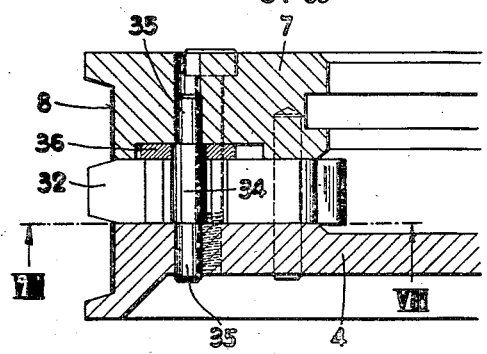

In the embodiment shown in Figs. 7 to 9, the recesses 10 are formed between pieces 31 which are clampedly fixed between the bodies 4, 7 which are interconnected by means of screws 5. The tooth half-portions are formed by the beak-shaped exterior ends 11 of arms 32 which are pivoted on the axle pins 13. Leaf springs in the form of open-ended rings urge the arms 32 towards each other. The latter thereby are held in abutment against a cam 34 of which the coaxial ends are rotatably mounted in bores of the bodies 4 and 7. On one end of cam 34 is fixedly mounted an actuating arm 36 which is accommodated in a recess 37 of body 7. To the end of arm 36 remote from cam 34 is riveted a pin 38 of which the round head 38a is engaged in a transverse groove 39 of a ram 40 which is mounted in a bore 41 of body 7 to be movable in the radial direction of the driving element. In a groove on the exterior end of bore 41 is inserted a snap ring 42 on which is supported a spring plate 43 which in turn serves as support for one end of a helical spring 44, the other end of the latter bearing on the bottom of a blind hole 45 of ram 40. The interior end of the latter is forked and carries the axle pin 46 of a follower 47 which coacts with the stationary cam 48.

When follower 47 engages cam 48, ram 40 is moved radially outwards, and arm 36 together with cam 34 is rotated counterclockwise (Fig. 8). The levers 32 or, respectively, their exterior ends 11 which form the tooth half-portions, thus are spread and abut against the edge of hole 9 of tape 8.

Figure 10:
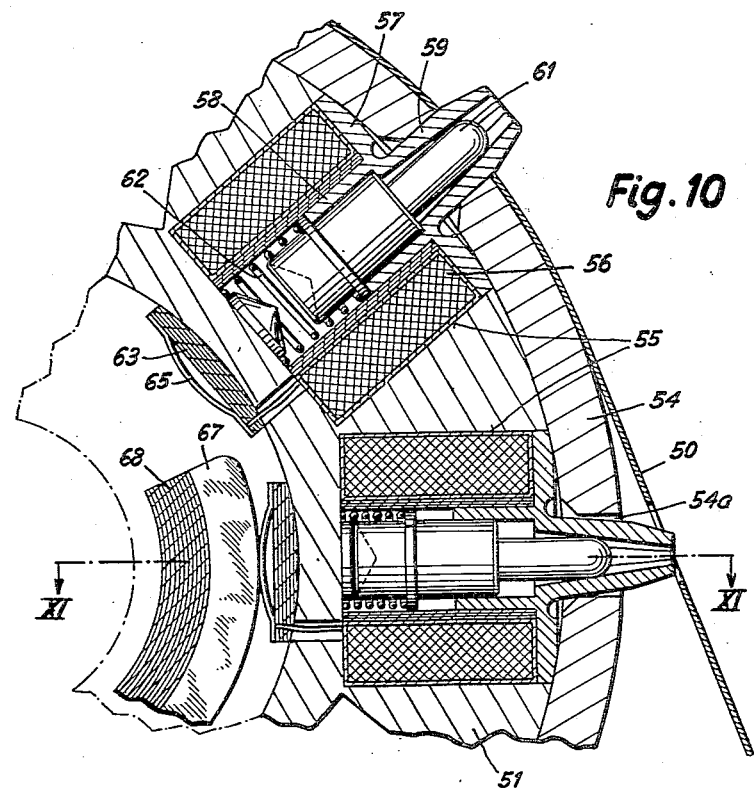
Figs. 10 and 11 illustrate a fourth embodiment which comprises teeth which also are spreadable in a transverse direction, Fig. 10 being a section substantially on the line X—X of Fig. 11, and Fig. 11 showing a section on the line XI—XI of Fig. 10.
Figure 11:
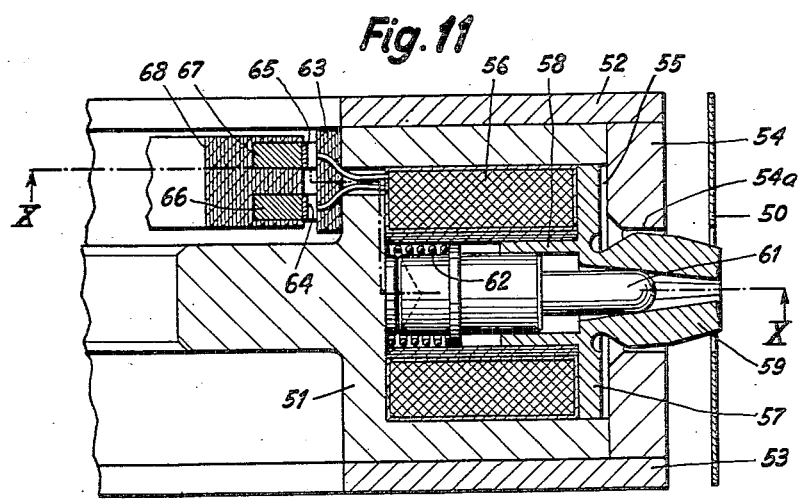

In Figs. 10 and 11, the perforated tape is designated by 50. The driving element in this example comprises a wheel body 51, two disks 52, 53 which, in a manner not shown, are secured to the latter, and a peripheral wheel member 54 consisting of a plurality of segments. In radial, cylindrical recesses 55 of wheel body 51 are rigidly mounted a solenoid 56 and a plate-like part 57 of a structural member which on the side nearer the axis of part 57 comprises a hollow cylindrical portion 58 and, on the other side, a sleeve-like portion 59. The latter has four outwardly tapering flanks and forms a tooth which projects from an aperture 54a of member 54. Said tooth is spreadable in the peripheral direction (or direction of movement) and in the transversal direction in that portion 59 is provided with slots 60 (Fig. 15) extending to its base and being situated in planes which are inclined with respect to said directions of spreading, i. e. diagonal across the corners of the teeth which are of rectangular cross-section, as may be seen, for example, from Fig. 15. The tooth jaws thus formed tend to occupy their contracted position as shown in the lower portion of Fig. 10 and in Fig. 11. Said tooth jaws are spreadable by means of a pin 61 of which the enlarged portion is guided in portion 58 and is pushed outwardly through a compression spring 62 which bears on the bottom of recess 55, the exterior rounded end of pin 61 protruding into the outwardly tapered central duct of portion 59 and spreading the parts thereof, viz. the tooth jaws. Pin 61 forms the armature of solenoid 56, upon the latter's excitation it is retracted so as to permit the tooth jaws to contract by virtue of their inherent elasticity and to abut against the walls of the diagonal slots. The solenoid winding is connected to two sliding contact pieces 64, 65 secured to the inside of wheel body 51 on an insulating plate 63 and coacting with a contact segment 66 and 67, respectively. The contact segments 66, 67 are embedded in an insulating supporting segment 68 which is fixedly disposed at such a point that the excitation of the solenoids passing by in succession and the contraction of the tooth jaws resulting therefrom, is performed so long as the perforated tape 50 is not snugly superposed on peripheral wheel member 54.

The embodiment shown in Figs. 12 to 14 differs from the embodiment just described by a somewhat different form of the wheel body which here is designated by 51', and by a different form of the structural member of which the plate-like portion 57' forms the transition between the sleeve-like diagonally-slotted portion 59' (which forms the tooth jaws) and the hollow cylindrical portion 58'. The exterior portion of spreader pin 61' is similar to that of the former embodiment; the thickened portion 72 has a cross-section out of true, as shown in Fig. 14, and is slidable in the recess of similar cross-section of part 58' which is rigidly mounted in wheel body 51'. The pin, therefore, cannot rotate about its own axis, and this is necessary since its inwardly directed end portion carries on its axle 69 a roller 70 formed by a ball bearing. Roller 70 coacts with a cam track 71 which is fixedly disposed at such a point that the outward movement of pin 61' initiated by the engagement of roller 70 on cam track 71, and the successive spreading of the tooth jaws 59' are effected only when the perforated tape (which is not shown in Figs. 12 to 14) is snugly superposed on wheel member 54'. Cam track 71 is depressed at such a point that the tooth jaws are contracted or collapsed before the perforated tape ceases contact with the peripheral member of the driving element. The pin then is moved radially inwards by spring 62' and then allows the tooth jaws to approach each other by virtue of their elasticity, as here also the central duct of the part 59' which forms these jaws, is conically tapered outwardly.

Many and various changes may be made in the embodiments shown. In particular, the spreading teeth could have a basal square shape instead of a rectangular one, as exemplified by the spreading tooth 59" shown in Fig. 17, or a basal circular form as the spreading tooth 59'" shown in Fig. 18.

What I claim as new and desire to secure by Letters Patent is:

1. In a conveyor including a perforated tape and a rotating toothed driving wheel therefor, the improvement comprising means for making the teeth of said wheel spreadable in the direction of movement, and operating means for maintaining each tooth in its spread condition and thus in contact with the wall of the perforation at the most only for such length of time as the tape is snugly superposed on that section of said wheel which is adjacent to the tooth under consideration.

2. A conveyor as set out in claim 1 comprising a plurality of levers pivoted to the wheel body, the exterior ends of any two adjacent levers projecting through an aperture of the wheel body and forming a tooth, and said lever ends in their spreaded condition contacting the wall of said aperture.

3. A conveyor as set out in claim 2, in which the levers are pivoted intermediate their ends and said operating means comprises cam followers between successive teeth, link means pivotally connecting each cam follower with the inner end of the nearest lever of the next preceding tooth and link means pivotally connecting said cam follower with the inner end of the nearest lever of the next succeeding tooth to form a toggle linkage, spring means for moving said cam follower in one direction and a stationary cam engaged by said cam follower as said wheel rotates and shaped to move said cam follower in an opposite direction to operate said levers at a selected point in the rotation of said wheel.

4. A conveyor as set out in claim 2, in which the levers are pivoted intermediate their ends and said operating means comprises radially movable pins between the levers of successive teeth, each of said pins engaging the inner end of the nearest lever of the next preceding tooth and the inner end of the nearest lever of the next succeeding tooth, said lever ends and pin having interengaging cam surfaces to swing said levers about their pivots when the pin is moved radially, spring means for moving each of said pins in one direction and a stationary cam engageable by said pins as the wheel rotates and shaped to move said pins in an opposite direction at a selected point in the rotation of said wheel to operate said levers.

5. A conveyor as set out in claim 4, in which a spring is inserted between the interior ends of the levers of each tooth, said springs being weaker than the spring means acting on said pins.

6. A conveyor as set out in claim 2, in which the levers are pivoted at their inner ends and said operating means comprises spring means acting on the pair of levers of each tooth to swing the exterior ends of said levers toward one another, a rotatable cam disposed between the levers of each pair and shaped to swing said levers away from one another upon rotation of said cam, and means comprising a stationary cam, cam followers and means connecting said cam followers to said rotatable cams to rotate said cams at selected points in the rotation of said wheel.

7. A conveyor as set out in claim 1, in which the teeth also are spreadable in the direction at right angles to the direction of movement, and the same mechanism serves for spreading each tooth in both directions.

8. A conveyor as set out in claim 7, in which each tooth is formed by a sleeve-like structural member, the latter having slots in planes inclined with respect to the directions of spreading, for the purpose of forming the spreadable tooth jaws.

9. A conveyor as set out in claim 8, in which the tooth jaws at their base are coextensive with a plate-like structural member and tend to occupy the contracted position in which a central duct of said member is conically tapered outwardly in the radial direction of the driving wheel, and in which a pin outwardly movable in said radial direction serves for spreading the jaws of each tooth.

10. A conveyor as set out in claim 9, in which the pin through a thickened portion is guided in a recess of a cylindrical part of the member comprising the tooth jaws.

11. A conveyor as set out in claim 10, in which the thickened portion of the pin forms the armature of a solenoid which serves for actuating the pin radially inwards against the action of a spring.

12. A conveyor as set out in claim 10, in which a compression spring is inserted between the plate-like structural member and the thickened portion of the pin for the purpose of moving the latter towards the axis of the driving wheel, whilst for moving the pin in the opposite sense the pin at its inner end is provided with a follower which coacts with a stationary cam surface.

References Cited in the file of this patent

UNITED STATES PATENTS 2,053,010   Schroeder _____ Sept. 1, 1936